United States Patent [19]

Batarseh et al.

[11] Patent Number: 5,434,767
[45] Date of Patent: Jul. 18, 1995

[54] POWER CONVERTER POSSESSING ZERO-VOLTAGE SWITCHING AND OUTPUT ISOLATION

[75] Inventors: Issa E. Batarseh, Oviedo, Fla.; Kasemsan Siri, Canoga Park, Calif.

[73] Assignee: University of Central Florida, Orlando, Fla.

[21] Appl. No.: 179,348

[22] Filed: Jan. 10, 1994

[51] Int. Cl.[6] .................... H02M 3/335; G05F 1/10
[52] U.S. Cl. ................................. 363/16; 323/222
[58] Field of Search .................. 363/16, 20, 21, 24, 363/25, 26, 222, 259, 344; 323/222, 259, 344

[56] References Cited

U.S. PATENT DOCUMENTS 4,885,675 12/1989 Henze et al. ................ 363/26
5,111,372 5/1992 Kameyama et al. .......... 363/20

Primary Examiner—Steven L. Stephan
Assistant Examiner—E. To
Attorney, Agent, or Firm—James H. Beusse

[57] ABSTRACT

A modified boost converter accomplishes power transfer to a load with an electrical isolation, a zero-voltage and a zero-current switching, a transformer core resetting mechanism, and component stresses identical to those in the conventional boost converters. The power converter contains two switching devices, a main one connected in parallel and a secondary one connected in series with a transformer primary winding. A secondary winding of the transformer is connected through an output rectifier to the load. Zero-voltage switching and proper transformer-core resetting are achieved from the resonance that exists between the parasitic capacitance of the secondary switching device and the magnetization inductance of the transformer. A transformer leakage inductance facilitates zero-current switching; thus, reducing the recovery time and current in the output rectifier, and the turn-on switching loss in the conventional main switching device. The switching converter contains a lossless clamping circuit, to limit the voltage stresses across both of the power switching devices to the reflected output voltage appearing across the primary.

10 Claims, 8 Drawing Sheets

POWER CONVERTER POSSESSING ZERO-VOLTAGE SWITCHING AND OUTPUT ISOLATION

BACKGROUND OF THE INVENTION

This invention relates to power systems and more particularly to DC-DC switching power converters having reduced power consumption.

Due to the widespread use of switchmode power supplies, utility AC power systems have to deliver power to an increasing number of non-linear loads. These non-linear loads create significant electromagnetic interference in the harmonic currents drawn from the utility power buses. In addition to the unnecessary losses in power transmission due to the presence of these harmonic currents, the utility systems are polluted since conductive and radiated electromagnetic interference can propagate and degrade the performance of other sensitive electronic equipments or appliances sharing the same power bus.

Conventional approaches use passive line filters to attenuate these interferences. These approaches are no longer effective because bulky components are needed to absorb the harmonic currents and the fundamental component of the currents still have higher RMS value than necessary.

The preferred remedy for attenuating interference is active power factor correction in which switchmode converter topologies are utilized. A boost converter is the best topology for this application because it can be operated to draw continuous current with much less harmonics, resulting in ease of line-filtering.

In the conventional boost converter topology, power transfer to the load is accomplished without electrical isolation from line to output since its output rectifier is a passive switch which cannot prevent a transformer inserted between the rectifier output and load circuit from saturating. The lack of electrical isolation makes it impossible to achieve a step-down output voltage in the single stage of power conversion.

Another type of boost converter configurations is the push-pull configuration. In the push-pull converter configurations, such as the converter described in U.S. Pat. No. 4,885,675, an isolation transformer is required to have two windings at the primary side and full-wave rectification at the secondary side so as to operate the transformer symmetrically without core saturation. However, the voltage stresses on the push-pull switching devices are twice the reflected output voltage at either side of the primary windings. Consequently, the push-pull boost converter will sacrifice more costly switching devices in order to achieve the same conduction losses yielded from the conventional boost converter. For example, a push-pull boost converter with nearly unity power factor used in a 200 volt AC system will require active switching devices having as high as 1000 volt breakdown voltage. The on-resistance of such switching devices is significantly high, causing more conduction losses.

SUMMARY OF THE INVENTION

This invention uses a modified single-ended boost converter circuit which is suitable for current shaping and EMI reduction applications due to its continuous input current. The inventive converter provides a step-up or step-down output voltage and provides electrical isolation using a transformer which requires only two transformer windings, i.e. one for a primary side and another for a secondary side.

A main switching device is connected through a choke in parallel with the return terminal of the line voltage and one terminal of the transformer primary winding. An additional secondary switching device is connected in series with the other terminal of the transformer winding. The secondary side of the transformer is connected through an output rectifier to the load.

A proposed auxiliary circuit is described that consists of the additional active switching device in series with the primary winding of the transformer. By adding this auxiliary circuit across the main switching device in the conventional boost converter and moving the rectifier to the secondary winding of the transformer, a modified boost converter is accomplished to provide step-up or down output voltage while achieving electrical isolation between the line and the output.

The additional active switch has parasitic capacitance which connects in series with the magnetization inductance of the primary winding. Due to the presence of parasitic capacitance across the additional active switch and magnetization inductance of the transformer primary winding, resonance occurs within the turn-off interval of the switch, thus facilitating zero-voltage switching. In addition, the turn-on loss of the main switching device is minimized due to the presence of the leakage inductance of the transformer which allows soft switching by providing a smooth diversion of the input choke current from the primary winding to the main switch. As a consequence, the recovery time and the current in the output rectifier are reduced without slowing down the turn-on switching transition time of the main switching device.

The switches are controlled with complementary pulses that are provided at a duty ratio of greater than 50% so as to provide sufficient time to reset the transformer core. Since the transformer turn ratio can be selected to provide step-up or step-down output voltage, the output voltage regulation can be accomplished in most applications despite the restricted range of the operating duty ratio.

The switching devices in the converter are controlled by pulses having a duty ratio of greater than 0.5 so that the voltage stresses on the switching devices are limited to the reflected output voltage across the primary winding.

The operational range of the duty ratio can be extended by providing a faster core-reset mechanism which requires an auxiliary transformer winding having a fewer number of turns than the secondary winding. However, the circuit will sacrifice higher voltage stress on the switching device that is connected in series with the primary winding while the voltage stress on the main switch remains unchanged.

DESCRIPTION OF THE PREFERRED EMBODIMENTS

Figure 1:
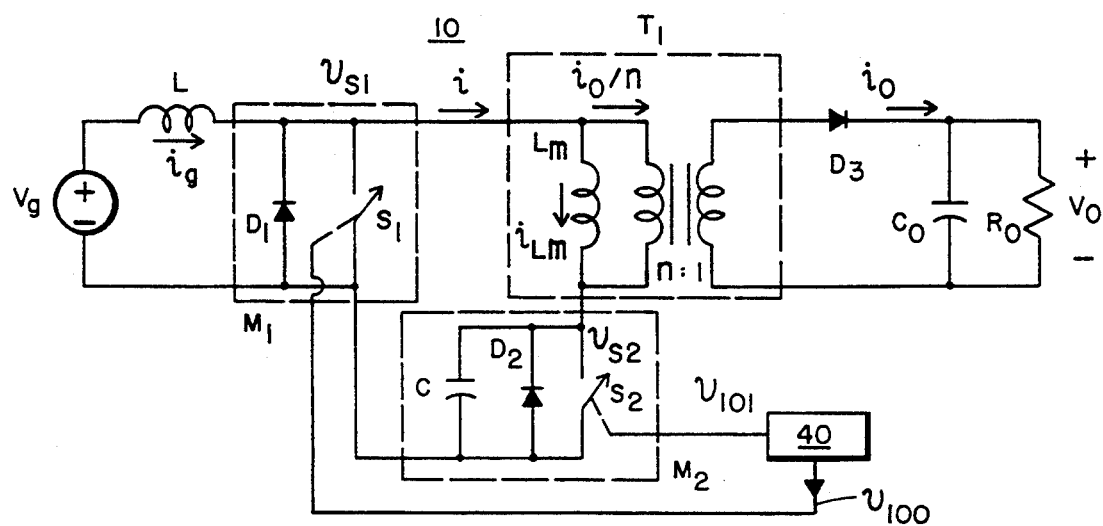
FIG. 1 is a schematic diagram of an ideal boost power converter circuit providing isolation and zero-voltage switching.

An ideal converter possessing zero-voltage switching (ZVS) and output isolation is shown in FIG. 1 and designated as 10. Circuit 10 is connected between line or voltage source $V_g$ and load $R_o$. Converter 10 has a choke or inductor L connected at an input terminal to voltage source $V_g$ with the other terminal of the choke connected to main switching MOSFET $M_1$. MOSFET $M_1$ is represented by diode $D_1$ and switch $S_1$.

MOSFET $M_1$ is connected in parallel with the circuit consisting of source $V_g$ and the choke L connected in series and is connected to a terminal on a primary winding of transformer $T_1$. MOSFET $M_2$ is represented by switch $S_2$, capacitor C and diode $D_2$ that are connected in series with the primary winding of transformer $T_1$.

Output transformer $T_1$ has a magnetizing inductance designated as $L_m$ that appears across the primary winding. Capacitor C is preferably a parasitic junction capacitance of MOSFET $M_2$. A control circuit 40 is connected to switch MOSFET $M_1$ and MOSFET $M_2$. Control circuit 40 provides complementary pulses $v_{100}$ and $v_{101}$ to enable MOSFETS $M_1$ and disable MOSFET $M_2$ or vice versa. Inductance $L_m$ and capacitor C form a series resonant circuit to permit switch $S_2$ to be turned on and off when the voltage $v_{S2}$ across switch $S_2$ is zero volts.

Transformer $T_1$ has a turn ratio of n:1 and provides electrical isolation and energy transfer from the input choke L and the voltage source $V_g$ to the output circuit or rectifier 42. Circuit 42 consists of diode $D_3$ in series with a secondary of terminal $T_1$ and a filter capacitor C. Output circuit 42 is connected in parallel with the secondary of transformer $T_1$ to load $R_0$. The value of the reflected output capacitance seen from the primary is $C_0/n^2$ and is much larger than the resonant capacitor C.

In FIG. 1, i denotes the transformer primary current which has two components, a reflected load current ($i_0/n$) and a magnetization current $i_{Lm}$. However only current $i_{Lm}$ contributes linearly to the magnetic flux stored in the transformer core. MOSFETS $M_1$ and $M_2$ are enabled and disabled so that a resonant phenomenon occurs in the converter circuit 10 to provide polarity reversal of $i_{Lm}$ within every switching period. Effectively, this polarity reversal causes the magnetic flux density in transformer $T_1$ to reset and to swing within the linear region of the transformer core characteristics.

Figure 2:
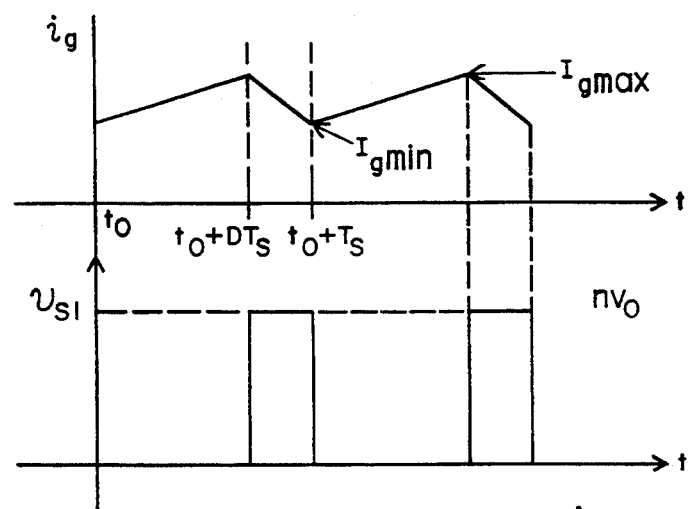
FIG. 2 are diagrams of waveforms of input choke current ($i_g$) and voltage drop across $S_1$ of the circuit shown in FIG. 1.

Assuming that the circuit 10 is operating in steady state and in the continuous conduction mode ($i_g(t) > 0$ at all times), waveforms of the converter input choke current ($i_g$) and the voltage across switch $S_1$ ($v_{S1}$) are shown in FIG. 2. Referring to FIG. 2, at time $t_0$, switch $S_1$ is turned on and $S_2$ turned off by circuit 40, causing $i_g$ to increase linearly in time and $v_{S1}$ being held at zero voltage. At time $t_0+DT_S$, circuit 40 turns off switch $S_1$ while switch $S_2$ is turned on a little before time $t_0+DT_S$ to keep current $i_g$ flowing smoothly through the primary winding of transformer $T_1$ thus avoiding a large voltage spike. At time, $t_0+DT_S$, the voltage $v_{S1}$ transits from zero to $nv_0$, i.e. the reflected output voltage across the primary winding. Voltage $v_{S1}$ remains at $nv_0$ until time $t_0+T_S$ when circuit 40 again turns on and off switch $S_1$ and $S_2$, respectively. Circuit 40 maintains a small overlapping on-time between switches $S_1$ and $S_2$ to ensure current $i_g$ maintains its continuity and deterministic slopes during switching transitions of both switches $S_1$ and $S_2$.

Figure 3:
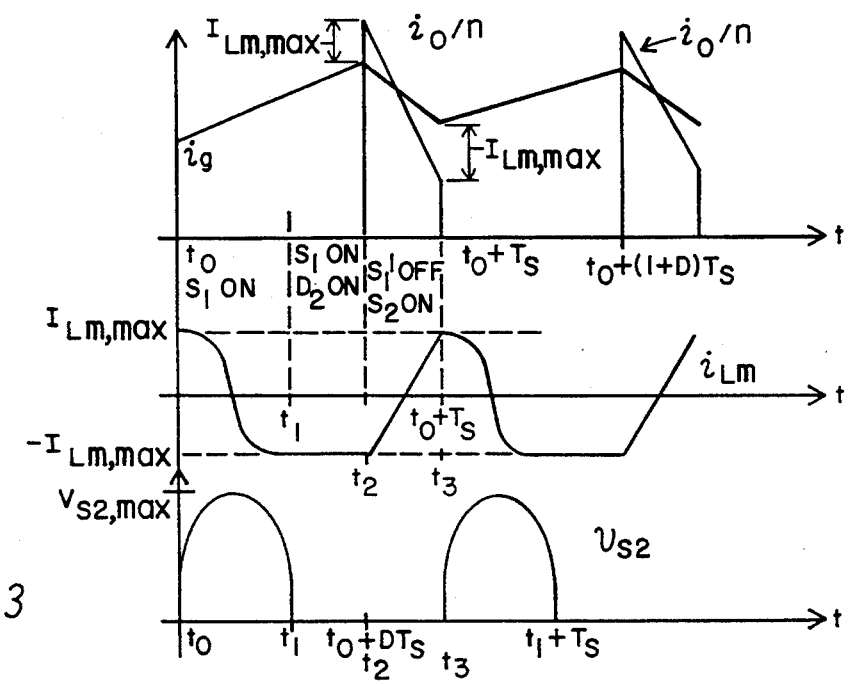
FIG. 3 are diagrams of waveforms of input choke current ($i_g$), reflected load current ($i_o/n$), magnetization current ($i_{Lm}$) and voltage across $S_2$ ($v_{s2}$) of the circuit shown in FIG. 1.

In FIG. 3, there is shown a more detailed waveform regarding the magnetization and the reflected-load currents ($i_{Lm}$ and $i_0/n$) in comparison with the input choke current ($i_g$) during converter 10 operation. In addition, the waveform of the voltage across switch $S_2$ (designated as $v_{S2}$) is shown to remain at zero from time $t_1$ until switch $S_2$ is turned on at time $t_0+DT_S$ to achieve zero-voltage switching.

During time $t_0+DT_S \leq t < t_0+T_S$, the majority of current $i_g$ contributes to the power transfer from the primary to the secondary side of the transformer $T_1$ which provides the DC power to the load circuit $R_0$. A small portion of current $i_g$ contributes to the magnetic energy stored in the transformer core, which is represented by the magnetization current $i_{Lm}$. During this time interval $i_{Lm}$ is increasing even though current $i_g$ is decreasing. Because a majority of current $i_g$ causes diode $D_3$ to remain forward-biased which results in a voltage $nV_o$ appearing across inductance $L_m$. The magnetization current $i_{Lm}$ increases linearly from a negative value to zero and then to a maximum positive value at time $t_0+T_S$.

At time $t_0+T_S$ (or $t_O$), diode $D_3$ is forced to turn-off by circuit 40 enabling switch $S_1$ and disabling $S_2$ resulting in current $i_{Lm}$ reaching its maximum value designated as $i_{Lm\,max}$. From time $t_0+T_S$ to time $t_1+T_S$ (or $t_0$ to $t_1$), inductor $L_m$ and capacitor C form a resonant circuit loop due to the conduction of switch $S_1$. As can be seen from the waveforms shown in FIG. 3, current $i_{Lm}$ decreases sinusoidally from its positive maximum ($I_{Lm,max}$), crosses zero and approaches its negative minimum ($-I_{Lm,max}$) while voltage across C($v_{S2}$) completes its positive half of a sine wave at time $t_1+T_S$ (or $t_1$). At time $t_1+T_S$ (o r $t_1$), antiparallel diode $D_2$ across capacitor C becomes forward-biased due to the negative current ($-I_{Lm,\,max}$) attempting to charge capacitor C in the opposite direction. Assuming that diode $D_2$ is ideal, the voltage across capacitor C is clamped to zero and causing zero voltage drop across inductor $L_m$. Consequently, current $i_{Lm}$ remains at its negative minimum ($-I_{Lm,max}$) until switches $S_1$ and $S_2$ are turned off and turned on, respectively, at time $t_0+(1+D)T_S$ (or $t_2=t_0+DT_S$).

Figure 4:
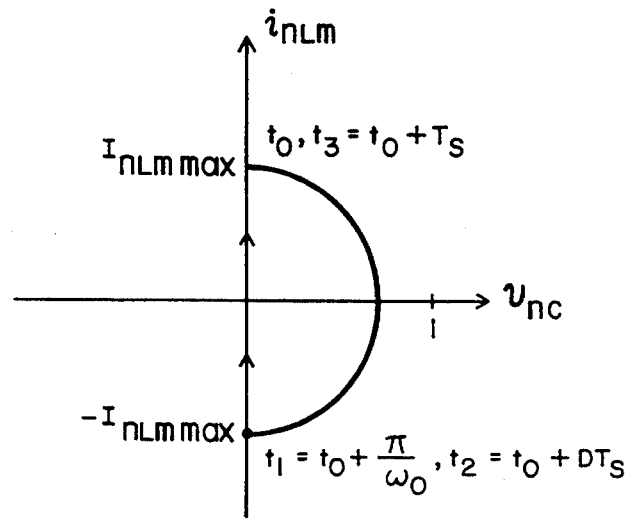
FIG. 4 is normalized trajectory of magnetization current and capacitor voltage of the circuit shown in FIG. 1.

From the waveforms of current $i_{Lm}$ and voltage $v_{S2}$ (or $v_c$ for simplicity) shown in FIG. 3, their normalized trajectory $$\left( \frac{i_{Lm}z_0}{nV_0} \text{ versus } \frac{v_c}{nV_0} \right)$$

can be constructed as shown in FIG. 4. The following quantities are defined for convenience:

$$z_0 = \sqrt{\frac{L_m}{C}}$$

$$\omega_0 = \frac{1}{\sqrt{L_mC}}$$

The resonant period $T_o$ must be properly determined to ensure that sufficient time is provided to reset the magnetic core in a resonant fashion. From the waveforms of current $i_{Lm}$ and voltage $v_{S2}$ (or $v_c$) shown in FIG. 3, $$\frac{T_0}{2}$$

is the time spent in resetting current $i_{Lm}$ from $I_{Lm,max}$ to $-I_{Lm,\,max}$, Which is equal to one half of the resonant period. This resetting time must be less than the time for turning-on of switch $S_1$ ($DT_S$). This condition can be expressed as $$\frac{T_O}{2} \leq DT_S \quad (1)$$

If we define the normalized switching frequency, $$\omega_{ns} = \frac{f_s}{f_O} = \frac{T_O}{T_S} \quad (2)$$

Equation (1) can be rewritten as $$\omega_{nS} \leq 2D \quad (3)$$

Figure 5:
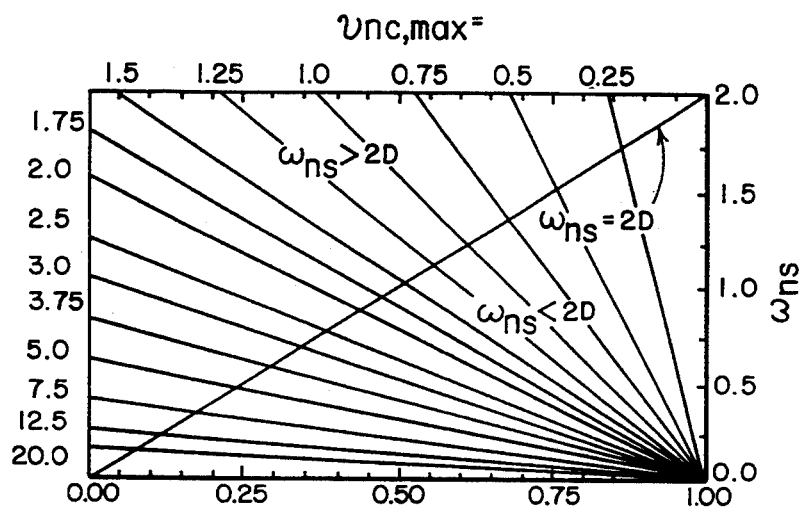
FIG. 5 are characteristics of ideal ZVS boost converter of the circuit shown in FIG. 1.

Equation (3) is characterized by the lower right triangular area shown in FIG. 5. If the selected $\omega_{nS}$ and D pair is located within the triangular area, the core-reset mechanism as well as zero-voltage switching of voltage $v_{S2}$ can be achieved successfully without saturating the core of transformer $T_1$. To facilitate the selection of switching of switching device $S_2$ with proper voltage ratings, one needs to characterize the relative voltage stress ($V_{S2,max}/nV_o$).

From the current $i_{Lm}$ waveform depicted in FIG. 3, the change in the magnetization current when switch $S_2$ is on from time $t_0+DT_S$ to time $t_0+T_S$ is $2I_{Lm,max}$. Therefore, we can write $$I_{Lm,max} = \frac{i_{Lm}(t_O + T_S) - i_{Lm}(t_O + DT_S)}{2} \quad (4)$$

$$= \frac{1}{2} \frac{nV_O}{L_m} (1-D)T_S$$

In terms of normalized quantity, (4) can be rewritten as $$I_{nLm,max} = z_0 \frac{I_{Lm,max}}{nV_O} = \frac{1}{2}(1-D)T_S \frac{z_0}{L_m}$$

or $$I_{nLm,max} = \tfrac{1}{2}(1-D)T_S\omega_0 \quad (5)$$

From the state-trajectory shown in FIG. 4, the normalized capacitor voltage of capacitor C, $$v_{nc} = \frac{v_{S2}}{nV_0}$$

is maximum when current $in_{nLm}$ reaches zero. Since the center of the circular trajectory is at the origin, we have the following expression:

$$v_{nC,max} = I_{nLm,max} = \frac{1}{2}(1-D)T_S\omega_o \quad (6)$$

From eq. (2) and $\omega_o = 2\pi f_o$, Eq. (6) can be rewritten as $$\omega_{nS} = \frac{(1-D)\pi}{v_{nC,max}} \quad (7)$$

From (7), relationship of $\omega_{ns}$ versus D can be plotted for several values of $v_{nC,max}$ as shown in FIG. 5. The design curves shown in FIG. 5 .aid in finding a maximum $\omega_{ns}$ that will yield the minimum voltage stress $v_{nC,max}$ an assigned duty ratio. Alternately, given a duty ratio, equations (3) and (6) may be solved to give values of $\omega_{ns}$ and $V_{nC,max}$ that can then be used to calculate the values for inductor L and capacitor C.

Zero-voltage-switching for both switches $S_1$ and $S_2$ is achieved if the increasing rate of the magnetization current is faster than the decreasing rate of the input choke current $i_g$ shown in FIG. 1. This can be accomplished at either light load conditions or by decreasing the magnetization inductance.

During the recovery time of the output rectifier 42, its recovery current will contribute to the fast increasing of the magnetization current and the slow decreasing of the input choke current through the conducted switch $S_2$. When the recovery current vanishes, the magnetization current will have already reached its positive maximum while the input choke L will have reached its negative minimum.

After the output diode rectifier $D_3$ is in a blocking state, the magnetization current will circulate through diode $D_1$ and switch $S_2$. During this time, the magnetization current latches at its positive maximum and the input choke L current increases. The diode $D_1$ remains conductive as long as the magnetization current is greater than the input choke current, thus providing zero-voltage switching for switch $S_1$. Sacrificing recovery loss, zero-voltage switching is achieved for both switches $S_1$ and $S_2$ in this manner.

Figure 6:
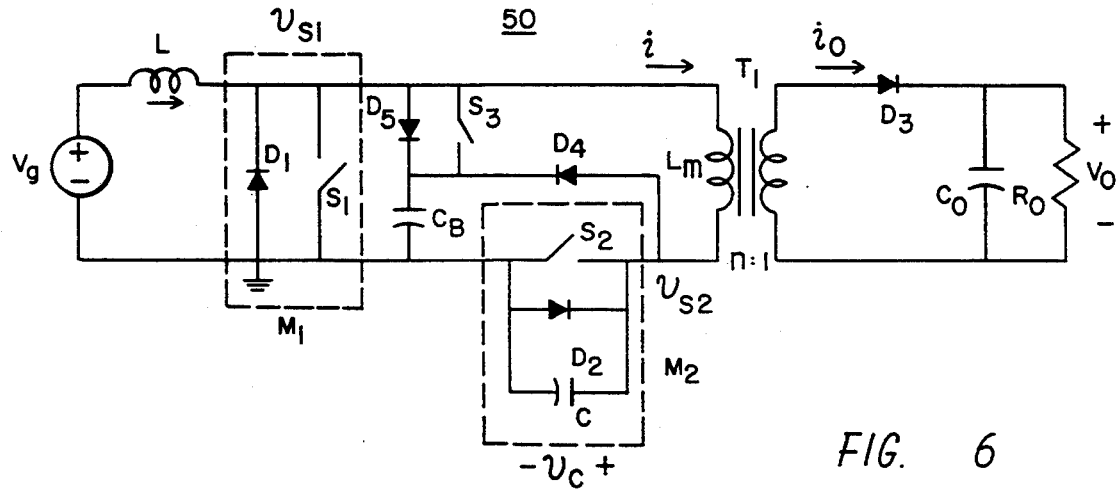
FIG. 6 is a schematic diagram of another proposed power converter circuit with zero voltage switching, near-lossless clamping circuit and output voltage isolation.

Another proposed circuit of the zero-voltage switching boost converter with isolation is shown in FIG. 6 and designated generally as circuit 50. Circuit 50 includes the series combination of the voltage source $V_g$ and inductor L connected in parallel with MOSFET $M_1$ to transformer $T_1$ primary winding. Circuit 50 also includes the MOSFET $M_2$ connected in series between transformer $T_1$ primary winding and a common terminal of voltage source $V_g$ and operates as previously described in FIG. 1. The secondary of transformer $T_1$ is connected to output rectifier 42.

A diode $D_5$ is connected in series with capacitor $C_B$ across MOSFET $M_1$. A switch $S_3$ is connected in series with diode a $D_4$ across the transformer T1 primary with a junction intermediate diode $D_4$ and switch $S_3$ connected to a junction intermediate diode $D_5$ and capacitor $C_B$.

Switches $S_1$ and $S_2$ are operated in a complementary fashion by controller 40. Diode $D_4$, switch $S_3$, diode $D_5$ and capacitor $C_B$ form an almost lossless snubber circuit that is used to suppress or clamp the switching transient voltages across $S_1$ and $S_2$. By selecting a proper value for capacitor $C_B$, the current rating of switch $S_3$ can be made much smaller as compared to the size and current ratings of power switches $S_1$ and $S_2$.

Capacitor C is a parasitic component across the switching MOSFET $S_2$ which has very small capacitance as compared to capacitance of capacitor $C_B$. Inductance $L_m$ is the magnetization inductance appearing at the transformer $T_1$ primary. Inductance $L_m$ and capacitor C form a resonant tank circuit which makes zero-voltage switching possible. Transformer $T_1$ provides electrical isolation and energy transfer from the input choke L and the voltage source $V_g$ to the output circuit or rectifier 42 which consists of diode $D_3$, capacitor $C_o$ and load resistor $R_o$. The reflected output capacitance $C_o n^2$ is much larger than snubber the capacitance $C_B$.

In practice, to assure that the input choke L is never open circuited, both of the switches $S_1$ and $S_2$ should have a small amount of overlap in their on-times. When $S_1$ is off, $S_2$ and $S_3$ are turned on. The on-state of $S_2$ allows the energy transfer from the input circuit (L and $V_g$) to the output circuit via transformer $T_1$. Switch $S_3$ is turned on (within the turn-off interval of $S_1$) by controller to regulate the voltage across the snubber capacitor $C_B$ to the reflected output voltage across the primary winding of transformer $T_1$. When the circuit responses reach their steady states, the voltage across capacitor $C_B$ settles at $nV_0$.

The minimum duty ratio that allows just sufficient core-resetting mechanism is determined by the magnetization current $i_{Lm}$ and the voltage across $S_1$ and $S_2$ ($V_{S1}$ and $V_{s2}$, respectively). From FIG. 6, i denotes the transformer primary current which has two components: the reflected load current $i_o/n$ and the magnetization current $i_{Lm}$. To analyze the response due to the magnetization current that only contributes to the magnetic flux in the transformer core, the reflected load current has been excluded from current i. Hence, the waveform of current $i_{Lm}$ to be shown will proportionally represent the magnetic flux accumulated in the core. Typical normalized waveforms of voltage $V_{nC}$ and current $i_{Lm}$ are shown in FIG. 7.

Figure 7:
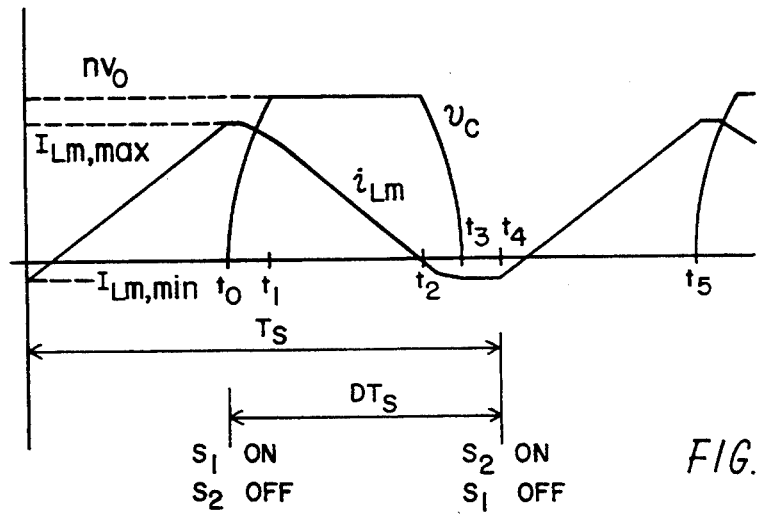
FIG. 7 is a diagram of a waveform for $i_{Lm}$ and $v_c$ of the circuit shown in FIG. 6.

Referring to FIG. 7, at time $t=t_\phi$, $S_2$ is turned off in a very short time after turning on of switch $S_1$, resulting in the magnetization current $i_{Lm}$ to resonantly decreasing from $I_{Lm\,max}$ while the input choke current is linearly increasing through switch $S_1$. Current $i_{Lm}$ charges capacitor C and causes $v_C$ to resonantly increase. At time $t=t_1$, $v_{C26}$ is clamped to the voltage across capacitor $C_B$ which is equal to $nV_0$ by the forward bias of diode $D_4$. From this time, $i_{Lm}$ decreases linearly.

At time $t=t_2$, current $i_{Lm}$ reaches zero and diode $D_4$ is naturally turned off, resulting in the resonant discharge of capacitor C through the magnetization inductance $L_m$ and $S_1$. During this time, current $i_{Lm}$ becomes negative. When voltage $v_C$ decreases to zero at time $t=t_3$, the negative magnetization current will cause diode $D_2$ to conduct and current $i_{Lm}$ is latched at $I_{Lm,min}$ through diode $D_2$ and switch $S_1$. Voltage $v_C$ remains at zero during this time. The sustained conduction of diode $D_2$ allows switch $S_2$ to be turned on at zero-voltage. Later, switch $S_1$ is turned off at time $t=t_4$ while switch $S_2$ has just been turned on. From this time, voltage across switch $S_1$, $v_{S1}$, is first clamped to the voltage across capacitor $C_B$ and then clamped to the reflected output voltage $nV_0$. Without capacitor $C_B$ and diode $D_5$, $v_{S1}$ could have high frequency ringing transients due to the resonance between the parasitic capacitance across switch $S_1$ and the leakage inductance of the transformer.

From time $t_4$ to $t_5$, current $i_{Lm}$ linearly increases from $I_{Lm,min}$ to $I_{Lm\,max}$. Within this time interval, switch $S_3$ is turned on to discharge the excess voltage across capacitor $C_B$ to the output circuit via transformer $T_1$. Thus, capacitor $C_B$ never has its voltage run away. At time $t=t_5$, $S_1$ is turned on to complete one switching cycle.

To reset the transformer core properly, the circuit 50 must operate at a duty ratio above some minimum duty ratio, $D_{min}$. For the sake of convenience, the voltage is normalized $v_0$ by $nV_0$ and the current $i_{Lm}$ is normalized by $(nV_0)/Z_0$ where $Z_0=\sqrt{L_m/C}$.

Figure 8:
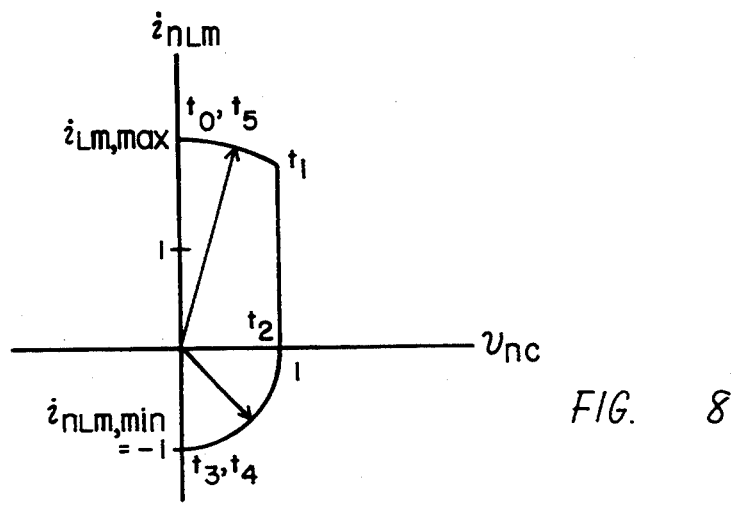
FIG. 8 is a state plane diagram of $i_{Lm}$ vs. $v_c$ for $i_{nL-max} > 1$ of the circuit shown in FIG. 6.

The trajectory of the normalized current $L_{nLm}$ versus the normalized voltage $v_{nC}$ are depicted in FIG. 8. Utilizing the geometry of this trajectory, two cases are analyzed to determine the minimum duty ratio $D_{min}$.

In the case where $i_{nLm,max}>1$, to operate the transformer core without magnetic saturation, the average voltage across the transformer primary winding must be zero over a switching period. Mathematically, this constraint may be written as, $$\frac{1}{T_S}\left[\int_{t_0}^{t_5} v_{S1}dt - \int_{t_0}^{t_5} v_c dt\right] = \overline{v_{S1}} - \overline{v_C} = 0 \quad (8)$$

where $v_{S1}$ is the voltage across switch $S_1$, $v_C$ is the voltage across switch $S_2$ and capacitor C(see FIG. 6) and the over-bar denotes average value of the variables. Since the average voltage over a switching period across an inductor is zero, the volt-second balance across the input choke L yields $$\overline{V_{S1}} = (1-D)nV_0 \quad (9)$$

Utilizing the waveforms shown in FIG. 7 and the state plane trajectory in FIG. 8, it can be shown that $$\omega_0 T_S D_{min} = \sin^{-1}\left(\frac{1}{\omega_0 T_S(1 - D_{min}) - 1}\right) + \sqrt{(\omega_0 T_S(1 - D_{min}) - 1)^2 - 1} + \frac{\pi}{2} \quad (10)$$

for $f_{ns} < 2\pi/(2 + \pi)$

Equation (10) is derived from the following relations:
When $i_{nLm,max}$ approaches unity, the following limiting values are obtained $$\lim_{i_{nL,max} \to 1} D_{min} = \lim_{i_{nL,max} \to 1} \frac{f_{nS}}{2} = \frac{\pi}{2+\pi}, \text{ and} \quad (11)$$

$$f_{ns} = \frac{2\pi}{2 + \pi}\bigg|_{i_{nL,max} \to 1}$$

The following expressions are derived:

$$D_{min} = \frac{t_{01} + t_{12} + t_{23}}{T_s}$$

$$i_{nLmax} - i_{nLmin} = i_{nLmax} + 1 = \omega_0 T_s(1 - D_{min})$$

$$t_{01} = \frac{\sin^{-1}\frac{1}{i_{nLmax}}}{\omega_0}$$

$$t_{12} = \frac{i_{nLmax}}{\omega_0} \cos\omega_0 t_{01}$$

$$t_{23} = \frac{\pi}{2\omega_0}$$

where $f_{ns} = 2\pi/\omega_0 T_S$.

In the case where $i_{nLm,max} < 1$, the trajectory of voltage $v_{nC}$ and current $i_{nLm}$ is shown in FIG. 4. Using the geometry of this trajectory, the minimum duty ratio can be expressed as $$D_{min} = \frac{t_{01}}{T_S} = \frac{T_0}{2T_S} = \frac{f_{ns}}{2} \quad (12)$$

for $f_{ns} > 2\pi/(2+\pi)$. Expressions for $D_{min}$ given by (10) and (12) are plotted versus the normalized switching frequency in FIG. 10 where the top line denotes our case (n=1).

Figure 9:
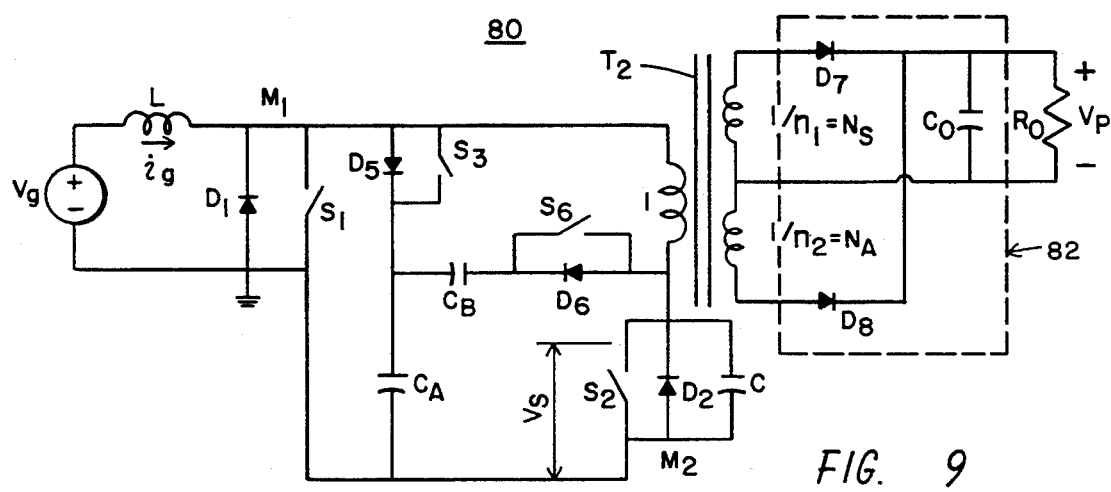
FIG. 9 is a schematic diagram of another proposed circuit with isolation and extended operational duty ratio.

FIG. 9 shows another modified version of the basic converter circuit that was introduced in FIG. 6 and is designated as 80. Circuit 80 includes inductor L connected in parallel with MOSFET $M_1$ to transformer $T_2$. Circuit 80 also includes MOSFET $M_2$ connected in series between the primary winding of transformer $T_2$ and the common terminal of voltage source $V_g$. MOSFET $M_1$ and MOSFET $M_2$ are represented by components as previously described in FIG. 1.

Diode $D_5$, connected in parallel with switch $S_3$, represents a MOSFET $M_3$ connected in series with a capacitor $C_A$ across MOSFET $M_1$. The parallel combination of switch $S_6$ and diode $D_6$, representing MOSFET $M_6$, is connected from one terminal of the primary winding of transformer $T_2$ to a capacitor $C_B$. The other terminal of capacitor CB is connected to the junction of capacitor $C_A$ and switch $S_3$. Output rectifier circuit 82 is connected to the secondary of transformer $T_2$. Rectifier circuit 82 includes diodes $D_7$ and $D_8$ connected in a full wave rectifier configuration with capacitor $C_o$ and load $R_o$. The full wave rectification requires a tapped secondary winding of transformer $T_2$. The main power transfer is accomplished by the conduction of diode $D_7$.

Figure 10:
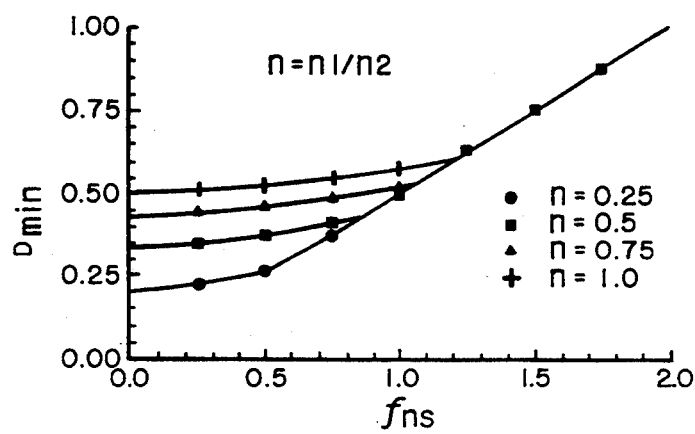
FIG. 10 are graphs displaying characteristic of $D_{min}$ vs. $f_{ns}$ for n=1.0, 0.75, 0.5, 0.25 of the circuit shown in FIG. 9.

Modified circuit 80 utilizes a transformer $T_2$ having an auxiliary winding $N_A$ having a fewer number of turns than the secondary winding $N_s$. As a result the turn ratio $N_A:N_S=n_1:n_2$ is less than unity to extend the minimum operational duty ratio below 0.5. Note that $n_1$ is the turn ratio from the primary to the secondary winding, and $n_2$ is the turn ratio from the primary to the auxiliary winding. Switches $S_6$ and $S_2$ are controlled with complementary driving signals and, in practice, should not have an overlap on-time between them. However, to achieve zero-voltage switching across switch $S_2$, $S_6$ must be turned off at least $T_0/4$ seconds before $S_2$ turns on, where $T_o$ is the resonant period forming by $L_m$ and C. Switches $S_2$ and $S_1$ are also driven by complementary signals but they should have overlapping conduction times. Switch $S_6$ limits the voltage across capacitor $C_B$ such that it does not deviate from $(n_2V_0-n_1V_0)$ while switch $S_3$ limits the voltage level across capacitor $C_A$ not exceeding above $n_1V_0$ volts. As usual, capacitors $C_B$ and $C_A$ are assumed to be much larger than capacitance C, the parasitic capacitance of $S_2$. We can calculate the minimum duty ratio $D_{min}$, given by the following equation for $i_{nL,max}>1$:

$$\omega_0 T_S D_{min} = \sin^{-1}\left[\frac{1}{\frac{n_1}{n_2}\omega_0 T_S(1-D_{min})-1}\right] + \sqrt{\left(\frac{n_1}{n_2}\omega_0 T_S(1-D_{min})-1\right)^2 - 1} + \frac{\pi}{2} \quad (13)$$

for $f_{ns} < \left(\dfrac{2}{\pi(n_1/n_2)} + 1\right)$ and for $i_{L,max}<1$ $$D_{min} = \frac{f_{ns}}{2}, \text{ for } f_{ns} > \frac{2}{\frac{2}{\pi(n_1/n_2)} + 1} \quad (14)$$

where $i_{nL}=i_L Z_0/(n_1V_0)$ and $v_{nC}=v_C/(n_1V_0)$. Using the expressions given by (13) and (14), we can plot the characteristic curves for $D_{min}$ versus $f_{ns}$. FIG. 10 shows these characteristics for n, = 1.0, 0.75, 0.5, 0.25, where $n=n_1/n_2$.

Figure 11:
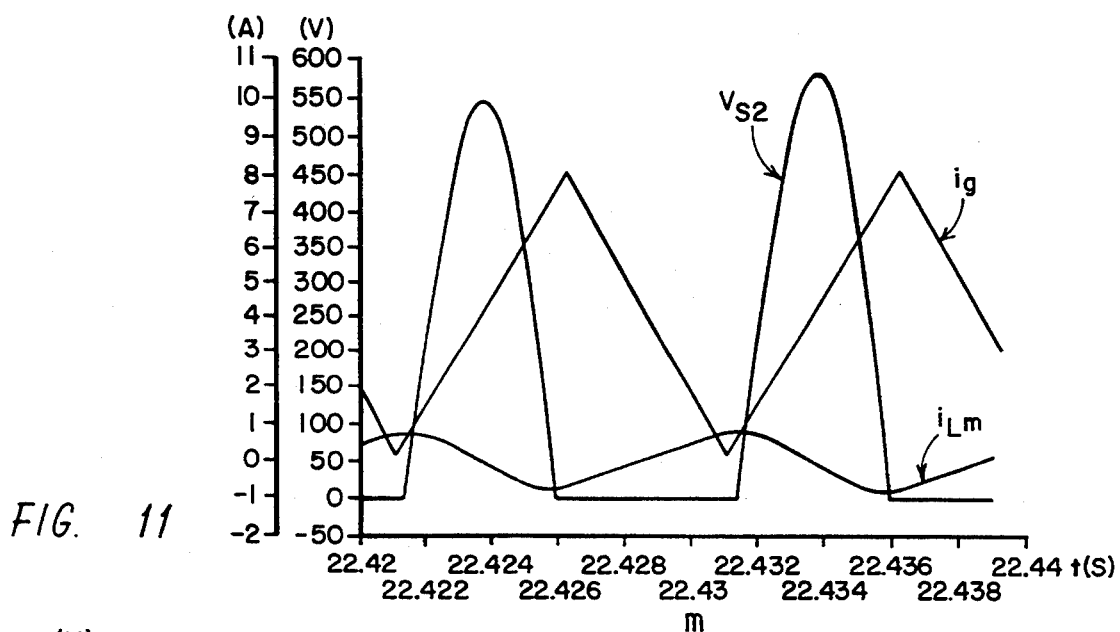
FIG. 11 are diagrams of simulation results for $v_{s2}$, $i_g$ and $i_{Lm}$ for duty ratio 0.5 of the circuit shown in FIG. 9.
Figure 12:
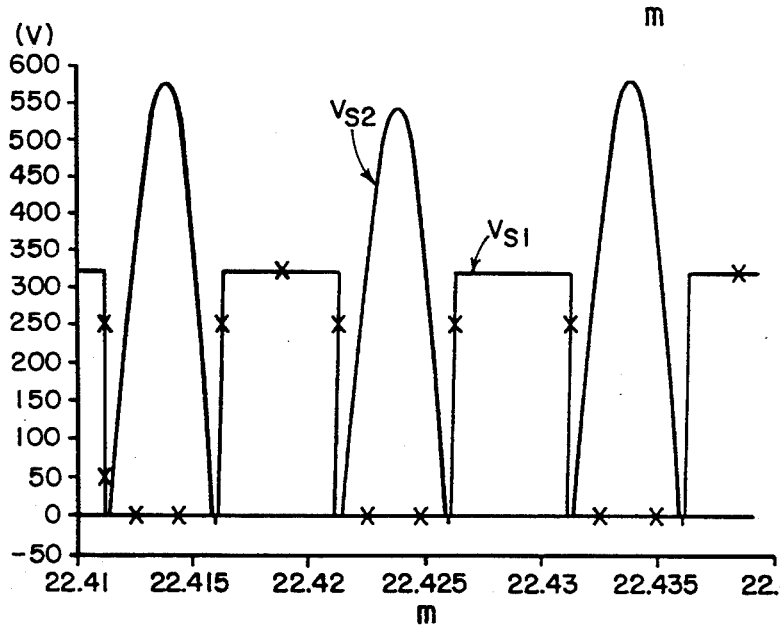
FIG. 12 are diagrams of simulation results for $v_{S1}$ and $v_{S2}$ for duty ratio 0.5 of the circuit shown in FIG. 9.
Figure 13:
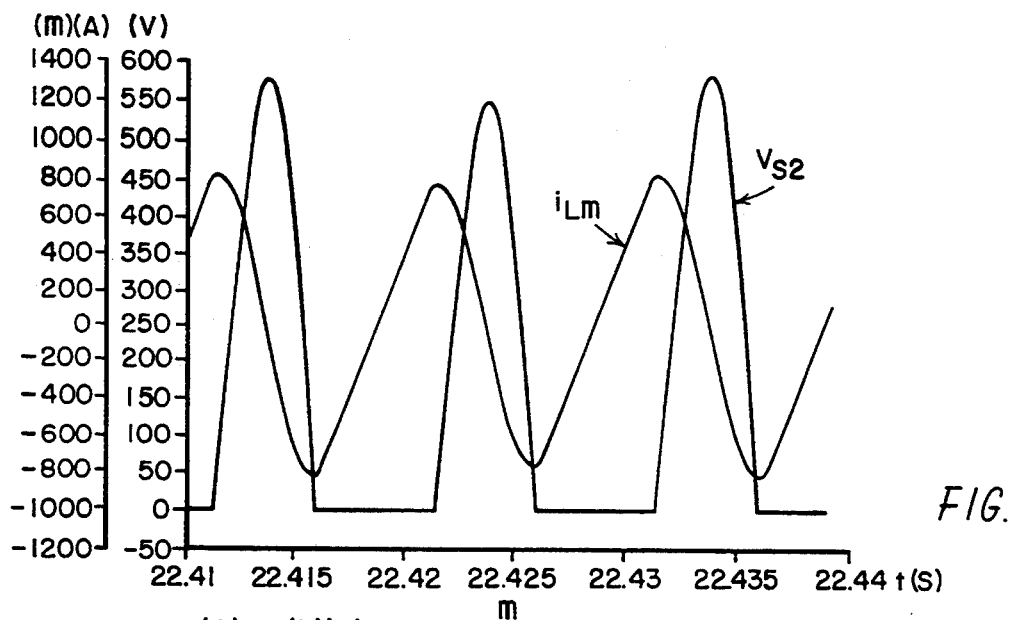
FIG. 13 are diagrams of simulation results for $i_g$ and $v_{S2}$ for duty ratio 0.5 of the circuit shown in FIG.

The converter shown in FIG. 1 was simulated at the duty ratio of 0.5 and 0.9 respectively. The following component values were used in the simulation:
Input voltage, $V_g=160$ V
Input choke, L=100 uH
Parasitic capacitance, C=800 pF
Transformer turns ratio, $n_p:n_S=1:1$
Transformer magnetization inductance, $L_m=1$ mH
Load resistance, $R_o=160$ ohm
Output filter capacitance, $C_o=100$ uF
Switching frequency, $f_s=100$ kHz FIGS. 11, 12 and 13 show the simulation results of the converter responses for the duty ratio of 0.5. FIG. 11 provides the voltage across switch $S_2$ ($v_{S2}$), the input choke and the magnetization currents ($i_g$ and $i_{Lm}$). The figure indicates that the converter is operated in the continuous conduction mode.

In FIG. 12, there is shown the voltages across switches $S_1$ and $S_2$ ($v_{S1}$ and $v_{S2}$). In this figure, voltage $v_{S1}$ and $v_{S2}$ have the overlap on-time which can be observed from the overlapping time-intervals of zero voltage of the both switches. Additionally, zero voltage switching of switch $S_2$ can be verified from this figure.

In FIG. 13 there is shown a more detailed waveform of the magnetization current ($i_{Lm}$) with voltage $v_{S2}$ as the reference waveform. Current $i_{Lm}$ swings between −800 and 800 mA and the shape of its waveform is in agreement with the theoretical waveform. The steady-state output voltage, which is not shown here, settles at 320.6 volts as expected.

Figure 14:
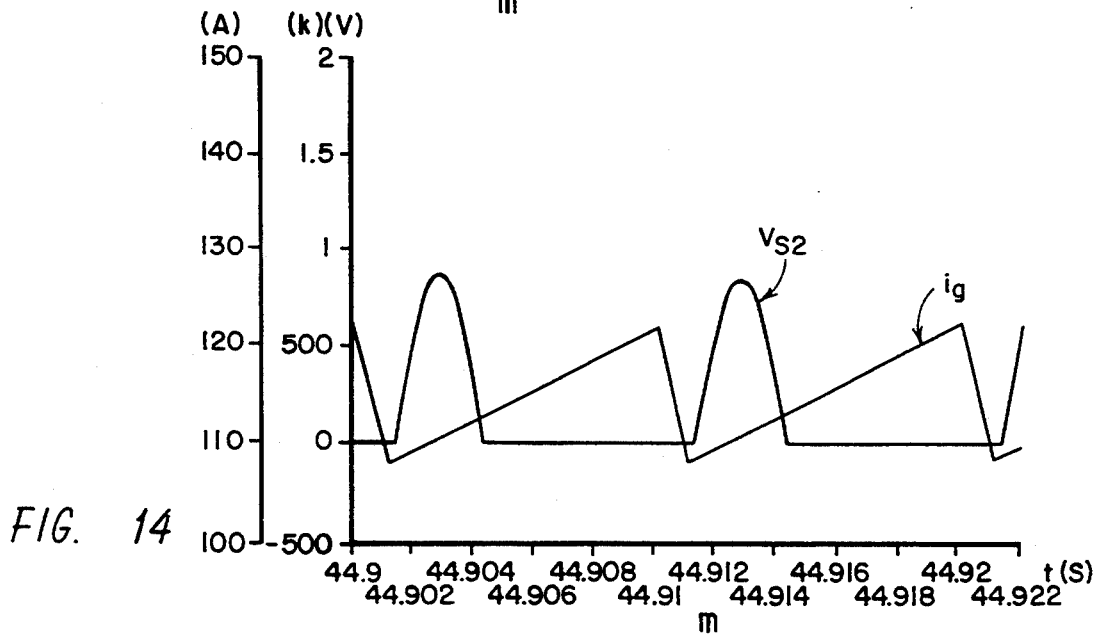
FIG. 14 are diagrams of simulation results for $i_g$ and $v_{S2}$ for duty ratio 0.9 of the circuit shown in FIG. 9.
Figure 15:
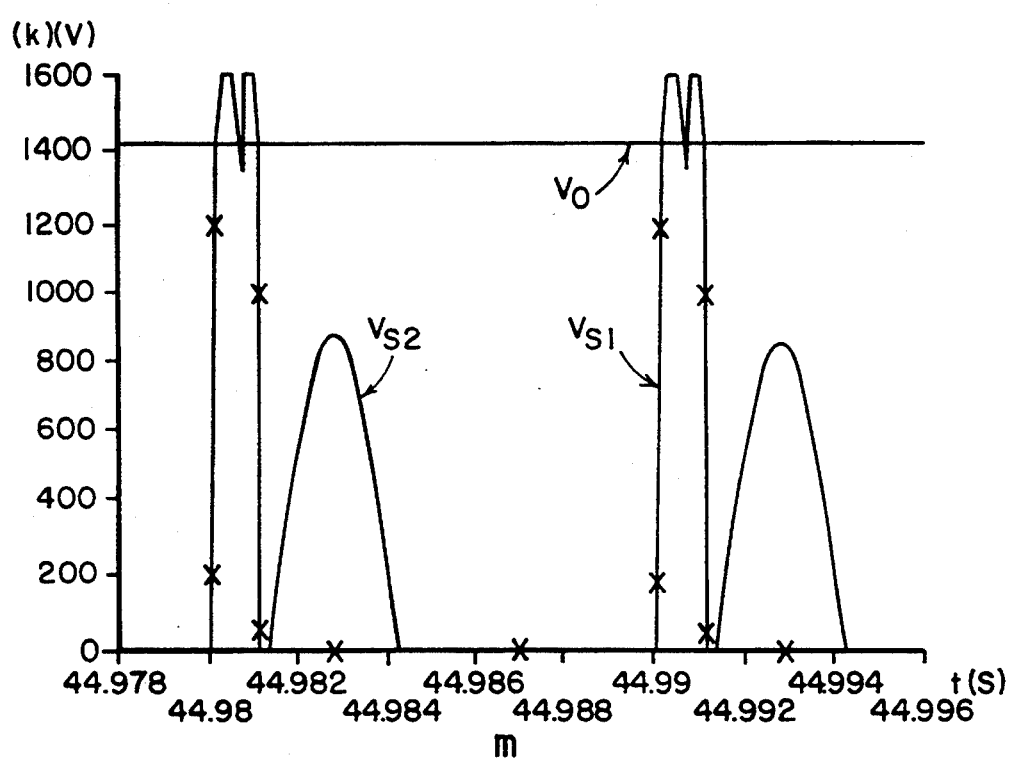
FIG. 15 are diagrams of simulation results for $v_{S1}$, $v_{S2}$ and $v_0$ for duty ratio 0.9 of the circuit shown in FIG. 9.
Figure 16:
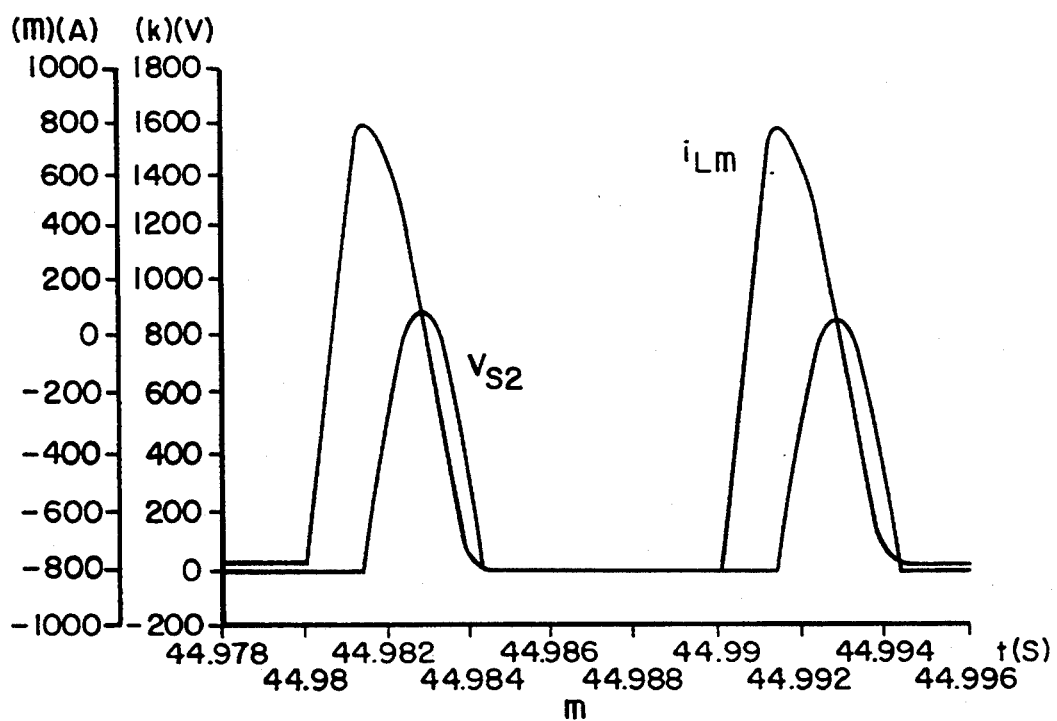
FIG. 16 are diagrams of simulation results for $I_{Lm}$ and $v_{S2}$ for duty ratio 0.9 of the circuit shown in FIG.

In FIGS. 14, 15 and 16 there is shown the simulation results of the converter responses for the duty ratio of 0.9. FIG. 14 gives the waveforms of $v_{S2}$ and $i_g$. The average current for $i_g$ is approximately 115 amps.

In FIG. 15 there is shown voltage $v_{S1}$ and $v_{S2}$. Again, the zero-voltage switching of switch $S_2$ is confirmed when $v_{S2}$ has its zero voltage before $S_2$ is turned on (or $S_1$ is turned off).

Finally, in FIG. 16 there is shown current $i_{Lm}$ and voltage $v_{S2}$. Similarly, current $i_{Lm}$ swings between −800 and 800 mA and has its waveform very close to the ideal waveform predicted from the theory.

A computer simulation of the circuit shown in FIG. 6 was carried out at 1 kW output load to demonstrate the zero-voltage switching capability of the converter. The following are the component values used in the simulation.

Figure 17:
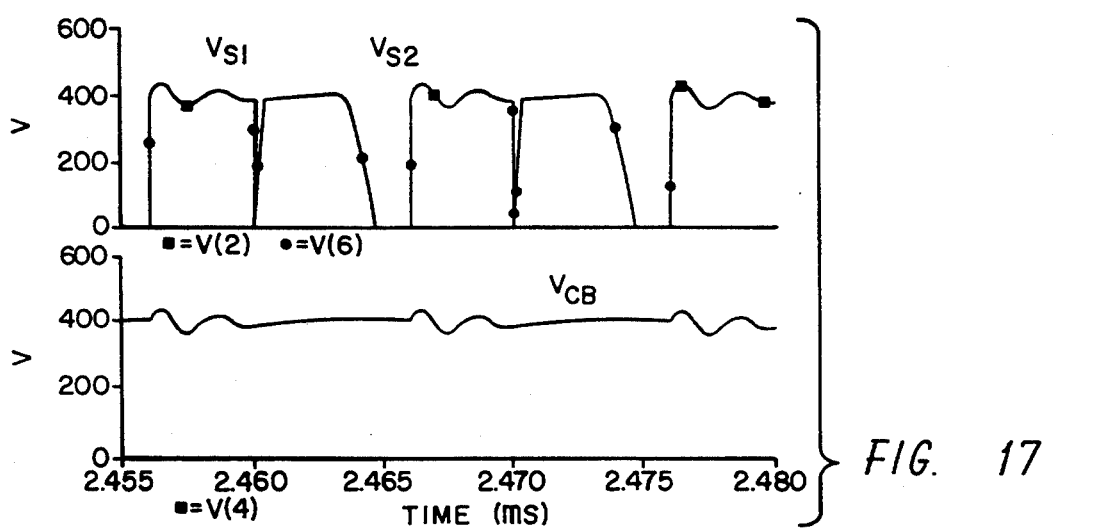
FIG. 17 are diagrams of preliminary results from the PSPICE simulation of the circuit shown in FIG. 6.

Input voltage, $V_q$=160 V
Input choke, L=100 μH
Parasitic capacitance, C=800 pF
Snubber capacitance, $C_B$=0.1 μF
Transformer turns ratio, $n_p$: $n_S$=1:1
Transformer coupling coefficient, $k_p$=0.999999
Transformer primary leakage inductance, $L_{1p}$=1 μH
Transformer magnetizing inductance, $L_m$=1 mH
Load resistance, $R_o$=160 Ω
Output filter capacitance, $C_o$=10 μF
Duty ratio, D=0.6
Switching frequency, $f_S$=100 kHz In FIG. 17 there is shown the preliminary simulation results of the voltage across snubber capacitor $C_B$ ($v_{CB}$ in the lower plot) and the voltages across switches $S_1$ and $S_2$ ($v_{S1}$ and $V_{S2}$ in the upper plot, respectively). The voltage across capacitor $C_B$ ($v_{CB}$) is observed to remain at a level around the reflected output voltage. The voltage across switch $S_2$ (the added switch), $V_{S2}$, reaches and remains at zero voltage before switch $S_2$ is turned on. Thus, the zero-voltage turn-on is achieved. The voltage across switches $S_1$ and $S_2$ aid in verifying that the switches are never turned off simultaneously. When switch $S_1$ is turned off, switch $S_2$ is already on and the voltage across switch $S_1$ is clamped to voltage $v_{CB}$. This confirms that the voltage stresses of the switches are limited to the reflected output voltage.

Figure 18:
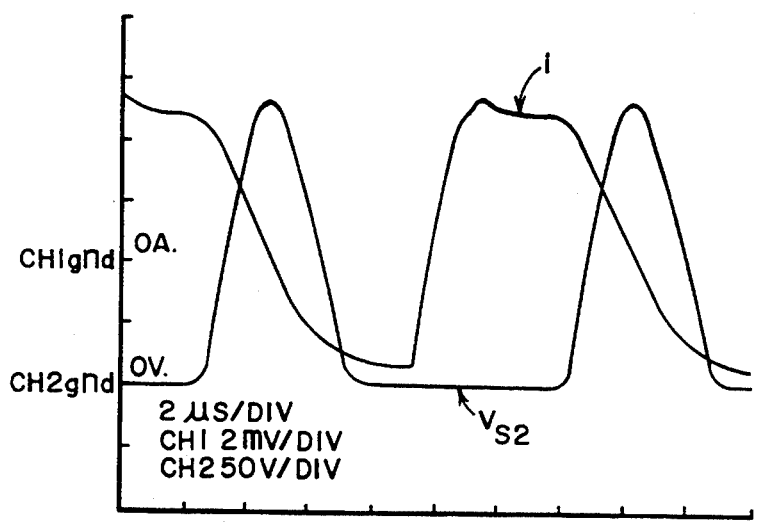
FIG. 18 are diagrams of experimental waveforms for primary current i and $v_{S2}$ of the circuit shown in FIG. 6.
Figure 19:
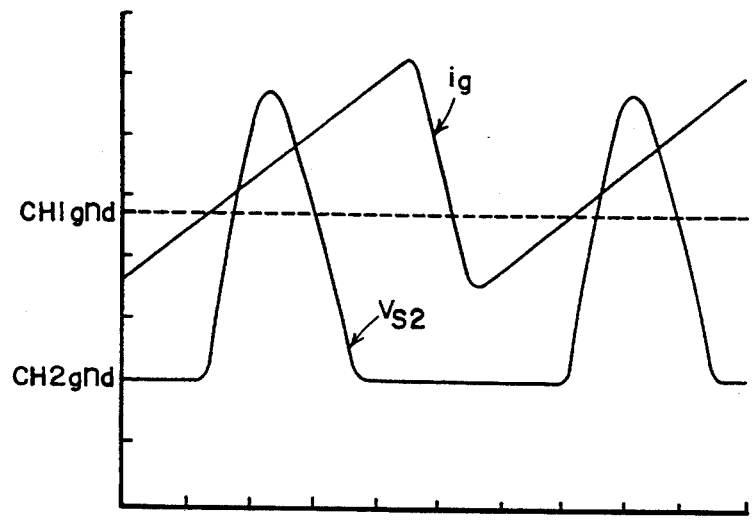
FIG. 19 are diagrams of experimental waveforms for input current $i_g$ and $v_{S2}$ of the circuit shown in FIG. 6.
Figure 20:
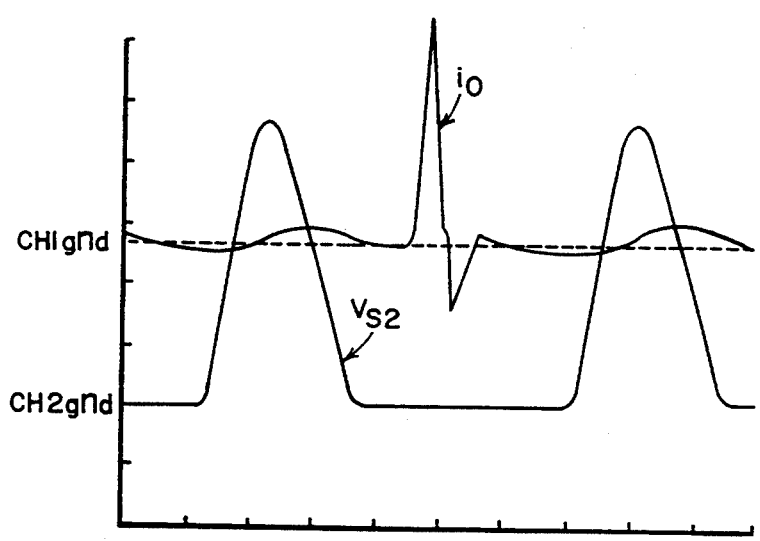
FIG. 20 are diagrams of experimental waveforms for the output rectifier current $i_o$ and $v_{S2}$ of the circuit shown in FIG. 6.

Preliminary results from the experimental setup at very light loads are shown in FIGS. 18, 19, and 20. FIG. 18 shows the current through the primary winding of the transformer and the voltage across switch $S_2$. In this case, the voltage across switch $S_2$ is below the voltage across capacitor $C_B$ because the normalized magnetization current is less than unity. This case occurs only at light load conditions. When switch $S_2$ is turned off, the voltage across it increases sinusoidally to its peak and then decreases to zero. At the same time, the magnetization current decreases from its peak to zero and becomes negative. Once the voltage across switch $S_2$ reaches zero and the magnetization current is negative, the body diode across switch $S_2$ is turned on and latches the current from time $t_1$ to $t_2$. In FIG. 19 there is shown the input choke current and the voltage across switch $S_2$. In light load conditions the input choke current can decrease from its positive peak down to zero and become negative. The negative portion of the input choke current occurs due to the recovery current of the output rectifier that is reflected to the primary.

The current through the output rectifier is shown in FIG. 20. Notice that the magnetization current has also built up to some positive value when the output rectifier is in transition from the reverse recover to its blocking state. The positive magnetizing current will cause diode $D_1$ across switch $S_1$ to naturally conduct, allowing the input choke current to build up linearly even though switch $S_1$ is not turned on. Since the input choke current is less than the magnetization current (latched due to conduction of diode $D_1$ and switch $S_2$), the conduction of diode $D_1$ will be sustained and overlap with the conduction of switch $S_1$. Thus, the duration of current increasing is longer than the duration of the on-time of switch $S_1$. As a result, the recovery duration of the output rectifier becomes beneficial because zero-voltage-switching is established across switch $S_1$ before it is turned on. Finally, the converter can fully operate with zero-voltage-switching for both switches $S_1$ and $S_2$ as described previously.

Figure 21:
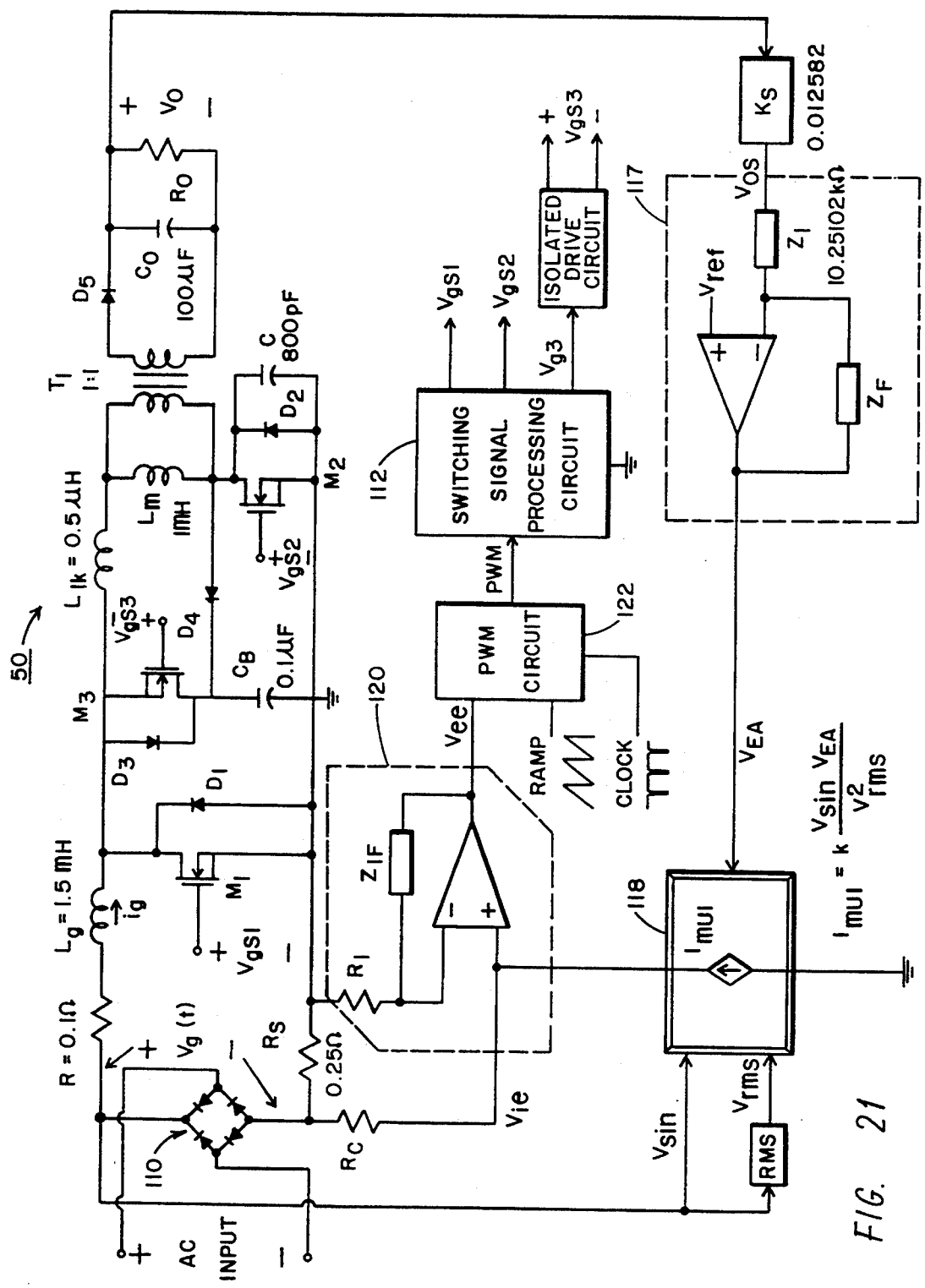
FIG. 21 is a block diagram of the active power factor correction system using ZVS current-fed converter.

In FIG. 21 there is shown a system block diagram incorporating the converter circuit 50 shown in FIG. 6. In circuit 50, switches $S_1$, $S_2$ and $S_3$ being MOSFETS are enabled by switching processing circuit 112 at the time intervals previously discussed. The input voltage of the converter is the rectified sine wave $v_g(t)$ obtained from the output of the full-bridge rectifier 110 connected to an ac source. The ac input of the full-bridge rectifier 110 can be the utility bus voltage having the frequency of 60 or 50 Hz.

The output of rectifier 110 is fed to circuit 50 to produce output voltage $V_o$. The output voltage $V_o$ of circuit 50 is scaled down through circuit $K_S$ and impedance $Z_1$ and compared to the reference voltage $V_{REF}$. The comparison difference is amplified and low pass filtered with amplifier 117 to yield the voltage error $V_{EA}$ which has its steady DC voltage superimposed with the negligible ac component in the steady state.

The voltage error $V_{EA}$ is modulated in device 118 by the rectified sine wave sampled from the pulsating input $V_{sin}(t)=V_g(t)$. The modulation output becomes the controlled current ($I_{MUL}$) which is proportional to the product of $V_{sin}$ and $V_{EA}$. The product $(R_s+R_c) \times I_{MUL}$ is used as the dynamic reference waveform of which the sinusoidal envelope is tracked by the scaled input current $R_s X i_g$ using the average-current mode controller 120. The averaged tracking error $V_{ee}$, the output of the controller 120, is fed to the pulse-width modulator circuit 122 which delivers the PWM switching signal as the output to circuit 112. Circuit 112 responds to the PWM switching signal to control the on and off time intervals of switches $S_1$, $S_2$ and $S_3$, as previously described.

In the active power factor correction (APFC) mode using the conventional boost converter, a PWM (pulse width modulation) signal can be used to control the main power switch directly. In this application of the proposed converter, switching signal processing circuit 112 is needed additionally to provide three switching voltages, $v_{gs1}$, $v_{gs2}$ and $v_{gs3}$ which are used to control the MOSFETS $M_1$, $M_2$ and $M_3$ respectively. The switching voltages $v_{gs1}$ and $v_{gs2}$ are almost complementary with some small overlapping on-time and no overlapping off-time. The switching voltages $v_{gs1}$ and $v_{gs3}$ are also almost complementary with sufficient overlapping off-time and no overlapping on-time.

The PWM signal is designed to have the minimum duty ratio of 0.55 and the maximum duty ratio of 0.95. The limited range of the operating duty ratio will provide the satisfactory system performance and the effective core-reset mechanism within the transformer $T_1$.

In addition, the switching signal processing circuit should be capable of shutting down all the switching signals ($V_{gs1}$, $V_{gs2}$ and $V_{gs3}$) to zero voltage in the event that the PWM input signal disappears. This automatic shut-down mechanism will ensure that none of the power MOSFETS is latched-on during the absence of the PWM signal. Since the voltage loop-gain bandwidth of the APFC system is dependent very much on the mean-square of the rectified input voltage, $v_g(t)$, the feed forward of the quantity proportional to the inverse of the mean-square of $v_g(t)$ is used to reduce the variation of the loop gain bandwidth within a certain range of the ac input amplitude. Therefore, the controlled current $I_{MUL}$ driven by the multiplier circuit 120 can be written as $$I_{MUL}(t) = \frac{kV_g(t)v_{ea}(t)}{V_{RMS}^2}$$

where $k=0.0031936$ is used in the simulation.

The average-current mode controller amplifies the actual tracking error $V_{ie}$ and provides the frequency compensated tracking error $V_{ee}$ as the output. The transfer function $V_{ee}(S)/V_{ie}(S)$ is $$\frac{v_{ee}(s)}{v_{ie}(s)} = \frac{Z_{IF}(s)}{R_1} + 1 \text{ where}$$

$$Z_{IF}(s) = \frac{1 + \frac{s}{\omega_z}}{k_I s \left(\frac{s}{\omega_p} + 1\right)}$$

where the constants $\omega_z$, $\omega_p$, and $k_I$ are given by,
$\omega_z = 21739.13$ rad/sec
$\omega_p = 438405.8$ rad/sec
$k_I = 2.42 \times 10^{-9}$ The DC output voltage is scaled down by a factor of $K_S = 0.012582$ and is low-pass filtered by the voltage comparator of which the transfer function is given by $$\frac{v_{ea}(s)}{v_{os}(s)} = \frac{K_{LP}}{\frac{s}{\omega_{p0}} + 1}$$

where,
$K_{LP} = 8.9747$ $\omega_{p0} = 252.7806$ rad/sec

This concludes the description of the preferred embodiments. A reading by those skilled in the art will bring to mind various changes without departing from the spirit and scope of the invention. It is intended, however, that the invention only be limited by the following appended claims.

What is claimed is:

1. A power converter circuit for converting a voltage level across a power and a common terminal of a voltage source to a different voltage level when supplying a load, the circuit comprising:

an input choke having an input and an output terminal, said input terminal being connected to the power terminal of the voltage source;

a main switching means comprising a first switch and a parallel connected diode between the output terminal of the choke and the common terminal for selectively establishing a current through said choke from said voltage source;

a transformer having a primary and a secondary winding, said primary winding having a first and a second input terminal, said first input terminal being connected to said output terminal of said choke;

a secondary switching means connected between the second input terminal of the transformer and the common terminal for selectively establishing a current through said transformer primary winding, said secondary switching means comprising a parallel combination of a capacitor, a diode and a second switch connected between said second input terminal and the common terminal;

a diode connected in series between said transformer secondary winding and the load;

an output capacitor connected in parallel with said load; and means for complementarily enabling and disabling said main and said secondary switching means to control current through the transformer primary winding.

2. The power converter circuit as recited in claim 1 further comprising:

a second diode connected in series with a second capacitor across the output terminal of the input choke and the common terminal of the voltage source, said second diode and second capacitor forming a main junction therebetween;

a third diode coupled between the main junction and the second input terminal of the primary winding; and a third switching means connected between the junction and the output terminal of the input choke for suppressing any transient voltages across the main and secondary switching means when current is varied through the transformer.

3. The power converter as recited in claim 2 further comprising:

means for comparing an output voltage across the load with a reference voltage to produce a voltage error voltage;

means for modulating the error voltage with the voltage source to produce a tracking error voltage; and means for enabling and disabling the main and secondary switching means in response to the tracking error voltage.

4. The power converter circuit as recited in claim 2 further comprising means for enabling and disabling the third switching means to regulate the voltage across the second capacitor to a reflected output voltage across the primary winding input terminals.

5. The power converter circuit as recited in claim 4 further comprising:
- a third capacitor connected between said third diode and said main junction; and
- a fourth switching means connected in parallel with said third diode for limiting the voltage across the second capacitor to be within a predetermined range.

6. The power converter circuit as recited in claim 5 wherein said third switching means limits the maximum voltage level across the second capacitor to a predetermined level.

7. A power converter for providing a regulated DC output from an unregulated DC voltage source, the voltage source having a pair of output terminals of relatively positive and negative polarity, the power converter comprising:
- an input choke having an input terminal and an output terminal, said input terminal being coupled to one of the pair of output terminals of the voltage source;
- a first switching means coupled in circuit between said output terminal of said choke and another of the pair of output terminals of the voltage source;
- a single-ended transformer having a primary winding and a secondary winding, each of said primary and secondary windings having first and second end terminals, a first end terminal of said primary winding being coupled to said output terminal of said choke;
- a second switching means coupled in circuit between said another of the pair of output terminals of the voltage source and a second end terminal of said transformer primary winding;
- an output rectifier means coupled to said end terminals of said secondary winding for providing a rectified DC output; and
- control means coupled to each of said first and second switching means and operative to selectively gate each of said switching means into and out of conduction so as to establish an alternating magnetization current in said transformer primary winding.

8. The power converter as recited in claim 7 wherein said enabling means enables and disables the second switching means when a voltage level across said second switching means is about zero volts.

9. The power converter of claim 7 wherein said second switching means comprises a semiconductor switching device having a parasitic junction capacitance and wherein said capacitance forms a series resonant circuit with a magnetizing inductance of said transformer primary winding to permit said second switching means to transition between on and off states under zero voltage switching conditions.

10. The power converter of claim 7 and including:
- a first diode;
- a capacitor connected in series with said first diode, said capacitor and diode in series being connected in parallel circuit with said first switching means;
- a third switching means connected in parallel circuit with said first diode;
- a second diode connected between said second end terminal of said primary transformer winding and a junction intermediate said first diode and capacitor; and
- means for controlling said third switching means to suppress switching transients on said first and second switching means.

* * * * *